(12) United States Patent
Verschuren

(10) Patent No.: US 7,082,081 B2
(45) Date of Patent: Jul. 25, 2006

(54) REPRODUCING INFORMATION DATA FROM A STORAGE MEDIUM USING FIRST AND SECOND LASER OF DIFFERENT WAVELENGTHS

(75) Inventor: Coen Adrianus Verschuren, Eindhoven (NL)

(73) Assignee: Koninklijke Philips Electroniics N.V., Eindhoven (NL)

( * ) Notice: Subject to any disclaimer, the term of this patent is extended or adjusted under 35 U.S.C. 154(b) by 505 days.

(21) Appl. No.: 10/208,684

(22) Filed: Jul. 30, 2002

(65) Prior Publication Data

US 2003/0026173 A1   Feb. 6, 2003

(30) Foreign Application Priority Data

Aug. 3, 2001   (EP)   .................................. 01202952

(51) Int. Cl.
*H11B 11/00*   (2006.01)
(52) U.S. Cl. .................................. 369/13.28; 369/13.09
(58) Field of Classification Search ............. 369/13.28, 369/13.08, 13.09, 13.06, 13.05, 13.29, 13.3, 369/116, 112.05, 112.06, 112.07, 112.08, 369/112.16, 112.17, 13.32, 124.3
See application file for complete search history.

(56) References Cited

U.S. PATENT DOCUMENTS

| | | | | |
|---|---|---|---|---|
| 5,093,822 A * | 3/1992 | Kugiya et al. | ............ | 369/13.28 |
| 5,530,688 A * | 6/1996 | Hurst et al. | ............... | 369/13.28 |
| 5,748,574 A * | 5/1998 | Chao | ........................ | 369/13.28 |
| 6,031,810 A * | 2/2000 | Nishikawa | ................... | 369/121 |
| 6,345,016 B1* | 2/2002 | Shiratori | ................... | 369/13.54 |
| 6,388,954 B1* | 5/2002 | Awano et al. | ............ | 369/13.28 |
| 6,483,783 B1* | 11/2002 | Mitani et al. | ............ | 369/13.15 |
| 6,600,698 B1* | 7/2003 | Uchida et al. | ............ | 369/13.28 |
| 6,633,514 B1* | 10/2003 | Awano et al. | ............ | 369/13.28 |
| 6,885,625 B1* | 4/2005 | Lee et al. | ................. | 369/13.28 |

* cited by examiner

*Primary Examiner*—Tan Dinh
(74) *Attorney, Agent, or Firm*—Michael E. Belk

(57) ABSTRACT

A method of reading out data from a domain expansion data storage such as a MAMMOS magneto-optic disk (1) which includes a data storage layer in which data is stored in the form of magnetic marks, and an expansion layer capable of copying and expanding domains from the storage layer, the system applying a first radiation beam (7), having a first spot size on the disk, in order to initiate copying of a domain from the storage layer to the expansion layer, and applying a second radiation beam (9), having a second spot size larger than the first spot size on the disk, in order to read out data from the expansion layer.

20 Claims, 3 Drawing Sheets

US 7,082,081 B2

REPRODUCING INFORMATION DATA FROM A STORAGE MEDIUM USING FIRST AND SECOND LASER OF DIFFERENT WAVELENGTHS

This invention relates to rewritable optical data recording systems, more particularly to magneto-optic data storage systems, and yet more particularly to domain expansion magneto-optic data storage systems.

Various proposals have been made to increase data storage densities in rewritable optical recording systems in the form of magneto-optic data storage systems. A technique known as laser pulsed magnetic field modulation (LP-MFM) allows marks of much smaller dimensions than that of the optical spot used to be recorded on a magneto optical storage medium. The marks are recorded as a sequence of crescent-shaped magnetic domains. Results such as the recording of 20 nm domains using a 0.6 µm spot have been demonstrated. However, the advantages of such small domains can only be achieved if data readout at such small dimensions is also possible. Conventional readout techniques limit the size of detectable marks on the medium to half the spot size.

Other techniques for read-out from a magneto optical storage medium have been proposed in order to reach higher data storage densities include magneto-optical (MO) domain expansion techniques such as MAMMOS (Magnetic AMplifying Magneto Optical System) first proposed in H. Awano, S. Ohnuki, H. Shirai and N. Ohta, Applied Physics Letters 69, (1996) 4257.

FIG. 1 schematically illustrates the MAMMOS process. During MAMMOS readout, a region on the disk is heated by a focused laser beam B. The disk includes a number of different functional layers, including a storage layer S and a readout, or expansion, layer E. The expansion layer is initially magnetised in the direction of the data spaces in the storage layer, whereas the storage layer also includes magnetic marks aligned in the opposite direction. One or more intermediate layers may be used to provide a magnetostatic coupling between the storage layer and the expansion layer. The compositions of the materials in the storage and readout layer are chosen in such a way that the magnetization of the storage layer increases (and thus the resulting stray field $H_{stray,storage}$) and that the coercivity $H_{c,read}$ of the expansion layer decreases as temperature is increased from room temperature. An external field $H_{ext}$ (in the mark direction) is added to $H_{stray,storage}$ during readout in synchronism with the data signals, so as to aid domain copying and expansion, and reversed in order to collapse an expanded domain so as to give a different readout signal if the next bit is a space, in which case domain copying and expansion does not occur. A minimum disk temperature $T_{copy}$ is required to copy a recorded mark into the expansion layer. Above this temperature, the sum of the mark's stray field at the expansion layer and the external field is larger than the coercivity of the readout layer:

$$H_{stray,storage} + H_{ext} > H_{c,read}. \quad (1)$$

Expansion of the copied domain will occur if the external field is sufficiently large. The magnetic state of the expanded domain is detected in the beam reflected from the expansion layer by measuring the rotation of the angle of polarisation caused by the Kerr effect on reflection from the expanded domain in the expansion layer, as in known magneto-optic systems.

For a certain length in the track direction the temperature necessary for copying a mark from the storage layer to the expansion layer, with the aid of the external magnetic field, is created by the laser beam. In this region copying is possible. It is therefore called the copy window.

If the laser power is decreased, the temperatures in the disk will drop, causing the coercivity to increase (profile shifts up) and the stray field to decrease. The size of the copy window will therefore become smaller. When the highest temperature in the temperature profile is lower than $T_{copy}$ the copy window is zero: no signal. On the other hand, if the laser power is increased, the coercivity profile shifts down and the stray field increases. Thus, the size of the copy window will increase.

The size of this copy window determines the dimensions of the smallest features that can be distinguished: if the copy window is larger than half the size of the smallest domain, overlap with neighbouring domains will occur, leading to additional peaks and incorrect readout. For correct readout, the resolution, i.e. the smallest domain should therefore be larger than two times the copy window.

Because the size of the copy window increases with increasing laser power, a value for the maximum copy window along with $T_{copy}$ (lower limit) corresponds to a range of laser powers. Thus, a higher resolution, requiring a smaller copy window, will reduce the range of possible laser powers, the power margin, and vice versa. In other words, the ultimate resolution will be determined by the power margin of the recording system.

A problem to be addressed relates to the power margins in order to achieve successful readout when high resolution is required in the readout process. A very small margin is generally obtained for high resolution, being a direct consequence of the fact that the tip of the thermal profile of a diffraction-limited spot in the red or blue part of the spectrum is quite broad compared to the domain length. A high numerical aperture (NA) blue laser system may be used to achieve a higher resolution in comparison with a lower NA red laser system. However, other problems arise when the wavelength is decreased and/or the numerical aperture is increased, including an increase in complexity of the optical system, and effects reducing the signal to noise level at the detector such as a reduction in the Kerr effect and an increase in shot noise at the detector.

In accordance with one aspect of the invention there is provided a method of reading out data from a domain expansion data storage medium, said medium comprising a data storage layer in which data is stored in the form of magnetic marks, and an expansion layer capable of copying and expanding domains from the storage layer, said method comprising:

applying a first radiation beam, having a first spot size on the storage medium, in order to initiate copying of a domain from the storage layer to the expansion layer; and applying a second radiation beam, having a second spot size larger than said first spot size on the storage medium, in order to read out data from the expansion layer.

It is noted that EP-A-899727 describes an optical recording and readout system using two optical beam spots for readout from a magneto-optic disk, however the system described therein is a domain wall displacement detection (DWDD) readout system, which differs significantly from the domain expansion medium readout system of the present invention, including the feature that domain wall displacement is used, rather than domain expansion, the storage and readout layers are coupled by magnetic exchange coupling and no external magnetic field is generally used during the readout process. DWDD requires an asymmetrical temperature gradient in the thermal profile to suppress "ghost signals". In the proposed system a beam producing a larger spot size is added to the conventional DWDD readout beam to improve the readout.

Features and advantages of the invention will be apparent from the following description of preferred embodiments of the invention, made with reference to the accompanying drawings, wherein.

Figure 2:
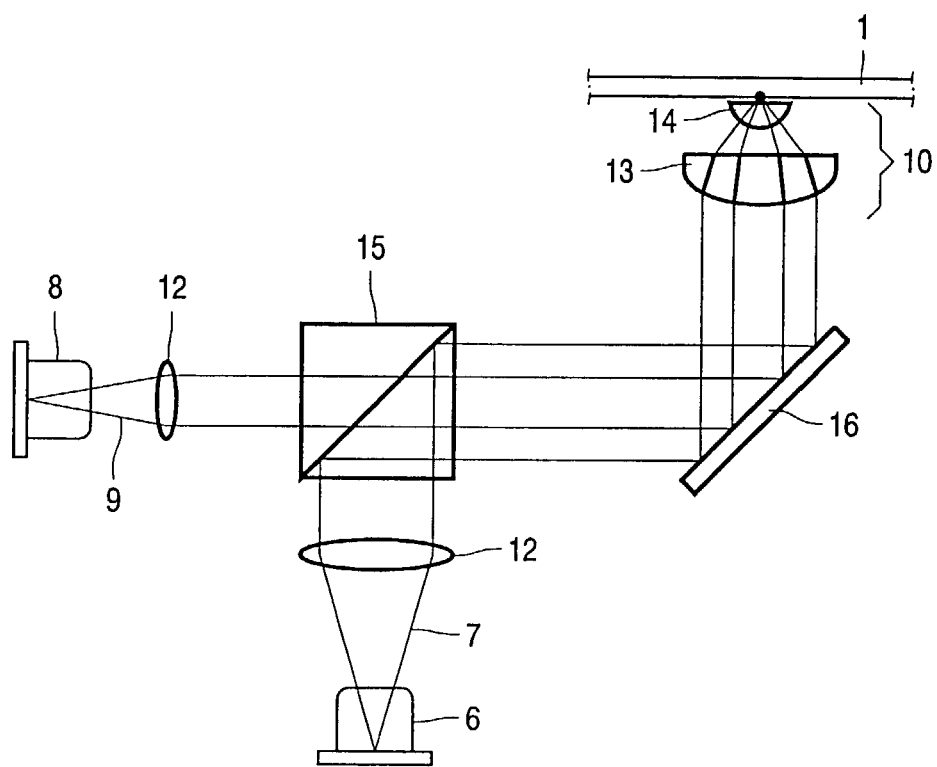
FIG. 2 is a schematic illustration of an optical scanning device arranged in accordance with a first embodiment of the invention.

FIG. 2 illustrates a magneto-optical scanning device in accordance with a first embodiment of the invention. A magneto-optical rewritable disk 1, in accordance with embodiments of the invention, is in the form of a MAMMOS disk which includes an outer cover layer and/or substrate layer, at least one of which is transparent and which are located on opposite sides of at least a storage layer and an expansion layer. An example of the layer structure of the MAMMOS disk is: 1.2 mm PC substrate/60 nm $SiN_x$/20 nm GdFeCo/5 nm $SiN_x$/50 nm TbFeCo/20 nm $SiN_x$/30 nm Al alloy. All layers are prepared by DC magnetron sputtering. The compensation temperature, at which the coercive field tends to infinity, is around room temperature for both MO layers, whereas the Curie temperatures are 320° C. and 270° C. for GdFeCo and TbFeCo, respectively.

Figure 1:
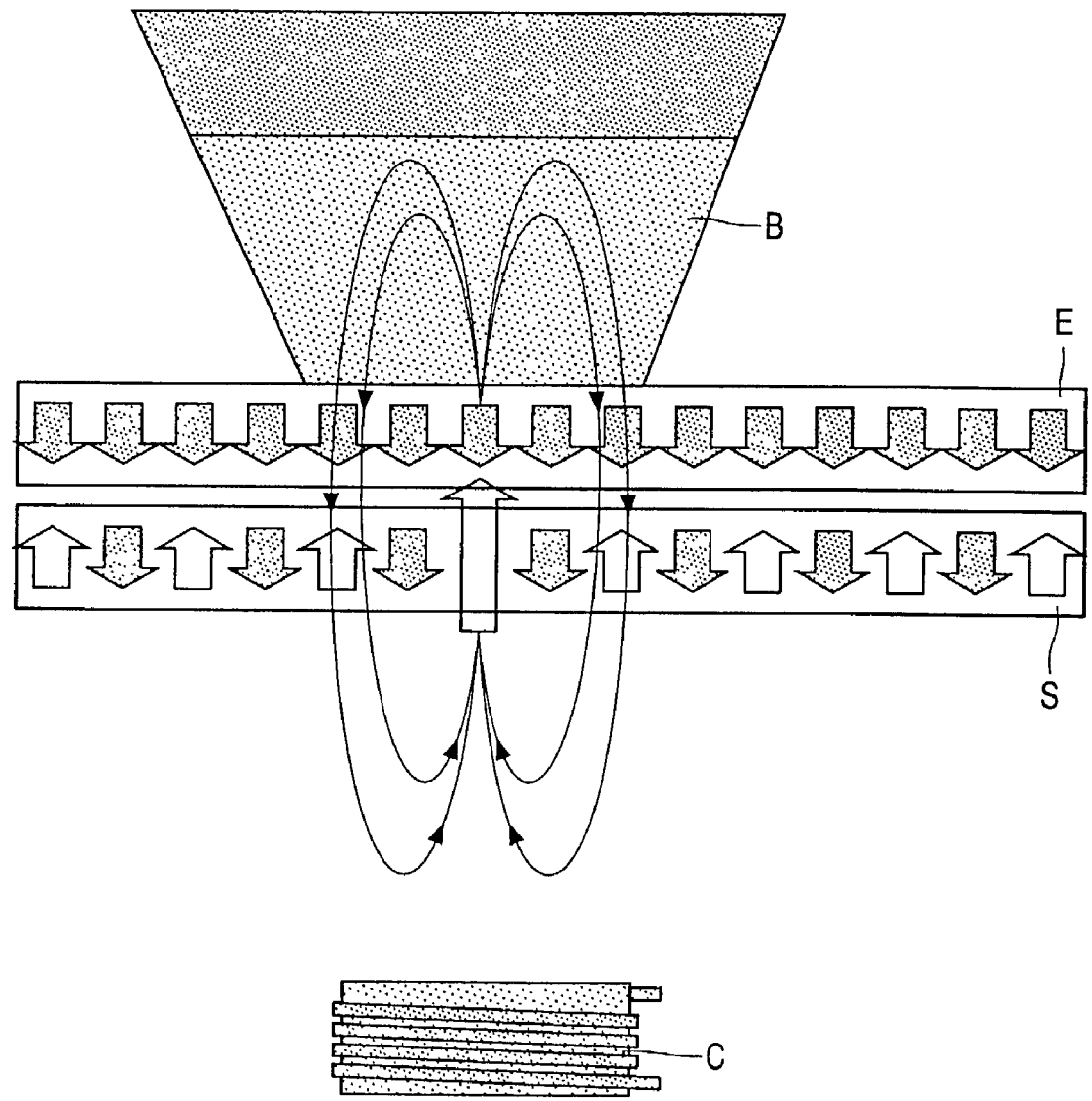
FIG. 1 is a schematic illustration of a MAMMOS recording system as used in embodiments of the present invention.

Information may be stored in the storage layer of the optical disk 1 in the form of marks arranged in substantially parallel, concentric or spiral tracks, not shown in FIG. 1. A land-groove structure may be used on the disk for conducting optical tracking. The marks are in magneto-optical form, generated for example by an LP-MFM recording technique.

The optical scanning device includes a first radiation source 6, for example a semiconductor laser, emitting a first radiation beam 7 with substantially all radiation being at a first wavelength $\lambda_1$, for example in the region of 430 nm, and a second radiation source 8, for example a semiconductor laser, emitting a second radiation beam 9 with substantially all radiation being at a second wavelength $\lambda_2$, for example in the region of 650 nm.

Each light path includes a collimator lens 12, a polarising and/or dichroic beamsplitter 15, a folding mirror 16 and a compound objective lens 10 that includes a back lens element 13 and a front lens element 14. The front lens element 14 is a plano-convex SIL. The front lens element 14 is held close to the entrance face of the upper disk, preferably within 1 wavelength of the radiation and generally within 1 µm, by means of an air-bearing slider (not shown) of suitable dimensions. In order to improve the tribology of the interface, a lubricant is coated on the cover layer 26. The lubricant may be formed from a polyfluoropolyether, such as those known as Fomblin™ and Zdol™. The lubricant forms a uniform layer of thickness typically less than 1 nm, formed by dip-coating the disk in a solution of the lubricant. The top surface of the cover layer may be treated with a hard coating of diamond-like carbon before the application of the lubricant, to improve the application of the lubricant.

Each respective collimator lens 12 transforms the diverging radiation beams 7 and 9 to a generally collimated beam. The first beam 7 is reflected by beamsplitter 15, whilst the second beam 9 is not.

The back lens element 13 focusses the first and second beams 7 and 9 to a convergent beam between the back lens element 13 and the front lens element 14. The back lens element 13 is movable with respect to the front lens 14 using servo actuators to conduct both tracking and focussing. The arrangement is shown in further detail in FIG. 3. The effect of the front lens element 14, being a Solid Immersion Lens (SIL) which couples light into the disk using a near-field evanescent coupling, is to increase the numerical aperture of the system further for the first beam 7, without introducing spherical aberration, or reducing unwanted spherical aberrations, as the first beam enters the entrance face of the disk, whilst having a more limited focussing effect on the second beam 9. The beams 7 and 9 are therefore each focused by the compound objective lens 10 to a spot formed on the expansion layer of the optical disk 1. The first beam has a relatively high numerical aperture $NA_1$, for example greater than 1 ($NA>1$), whilst the second beam has a relatively low numerical aperture $NA_2$, for example in the region of 0.6. Furthermore, the spots are preferably substantially diffraction limited, and $\lambda_1/NA_1 < \lambda_2/NA_2$. The first beam spot, measured in terms of the full width at half maximum (FWHM) amplitude, formed on the expansion layer is thus substantially smaller than, preferably less than half the size of, and more preferably less than a third of the size of, the second beam spot formed on the expansion layer.

The reflected beams are transformed by the optical system in correspondingly opposite stages, from divergent beams between the front lens element 14 and the back lens element 13, to collimated beams between the back lens element 13 and the collimator lenses 12.

The first beam 7 is reflected by beamsplitter 15 and focused by collimator lens 12 to a convergent reflected beam incident on a tracking error detector system collocated with the radiation source 6. The tracking error detector system captures the radiation and converts it into electrical signals. This signals are used to perform tracking error correction during scanning of the disk. This detector system may also be used to perform focus error detection.

The second beam 9 is focused by collimator lens 12 to a convergent reflected beam incident on a magneto-optic data signal detector system collocated with the radiation source 8. The data signal detector system captures the radiation and converts it into electrical signals. This signals are used to detect the data signal during scanning of the disk. This detector system may also be used to perform focus error detection, if it is not carried out at the tracking error detector.

An external field coil, not shown in FIG. 2, is located on one side of the disk, preferably the side of the disk on which the MAMMOS layers are held, and includes a field direction switching circuit for switching the magnetic field in synchronism with data read out, as known in the art of MAMMOS recording systems.

Figure 3:
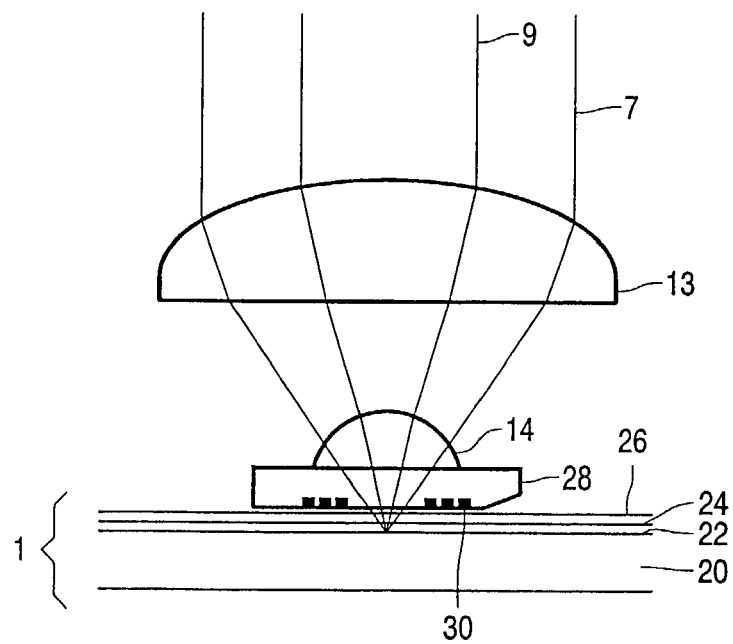
FIG. 3 is a schematic illustration of a part of the device shown in FIG. 2

Referring now to FIG. 3, the disk 1 in this embodiment includes a relatively thick substrate 20, having a thickness in the region of 0.6–1.2 mm, a magnetic data storage layer 22, a magnetic domain expansion layer 24 and a thin transparent cover layer having a thickness in the region of 5 to 20 µm, preferably approximately 10 µm. The front lens element 14 is mounted on a transparent slider 28, containing an MFM coil 30 used during data recording. The high NA beam 7 may be used for data recording during the MFM recording process.

Figure 4:
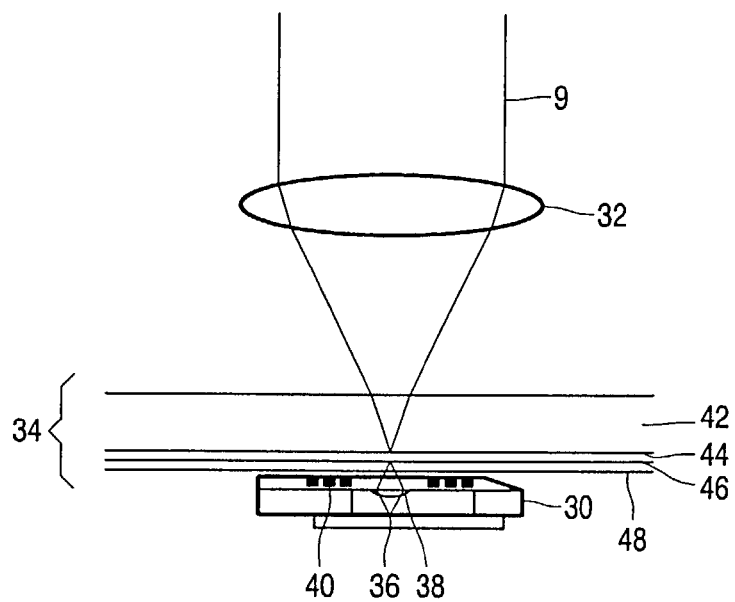
FIG. 4 is a schematic illustration of a part of an optical scanning device arranged in accordance with second embodiment of the invention.

FIG. 4 illustrates an alternative, second embodiment of the invention. In this embodiment, the optical components of the first beam 7, including the front lens element 13, are replaced by a slider 30 located on the opposite side of the optical disk, and having a radial movement mechanism moving in synchronism with that of the upper optical system. The upper optical system may be used to produce all of the data signal, a tracking error signal and a focus error signal. The back lens element 13 is replaced by an objective lens 32 optimised for the second beam 9. The MAMMOS disk 1 is replaced by a different format of MAMMOS disk 34.

The slider 30 includes a radiation source 36, for example a semiconductor laser, producing an equivalent to the first beam, at the first wavelength $\lambda_1$, which is focused into a planar waveguide structure with a very small output aperture producing a very small spot on the information-bearing layers of the disk 32. In an alternative embodiment, the high NA beam may be produced directly, without use of a separate waveguide, by a semiconductor laser with a small near field profile as for instance proposed in the Japanese Journal of Applied Physics, Vol 37 (1998) p. 3759. In further alternatives, fibers or lasers with a small output aperture, produced for example by means of a focussed ion beam, located close to the disk may be used to produce the small spot.

The MAMMOS disk 34 includes a transparent substrate 42, having a thickness in the region of 0.6–1.2 mm located on the side of the second beam 9, a magnetic domain expansion layer 44 located thereunder, a magnetic storage layer 46 located thereunder and a very thin cover layer 48, having a thickness for example in the region of 10 nm Slider 30 contains an MFM coil 40 used during data recording. The small spot generated by source 36 may be used for data recording during the LP-MFM recording process. Circuitry associated with the coil 40 includes a field direction switching circuit for switching the magnetic field in synchronism with data read out, as known in the art of MAMMOS recording systems. The coil 40 may thus be used in both the recording and readout of data to and from the disk.

Figure 5:
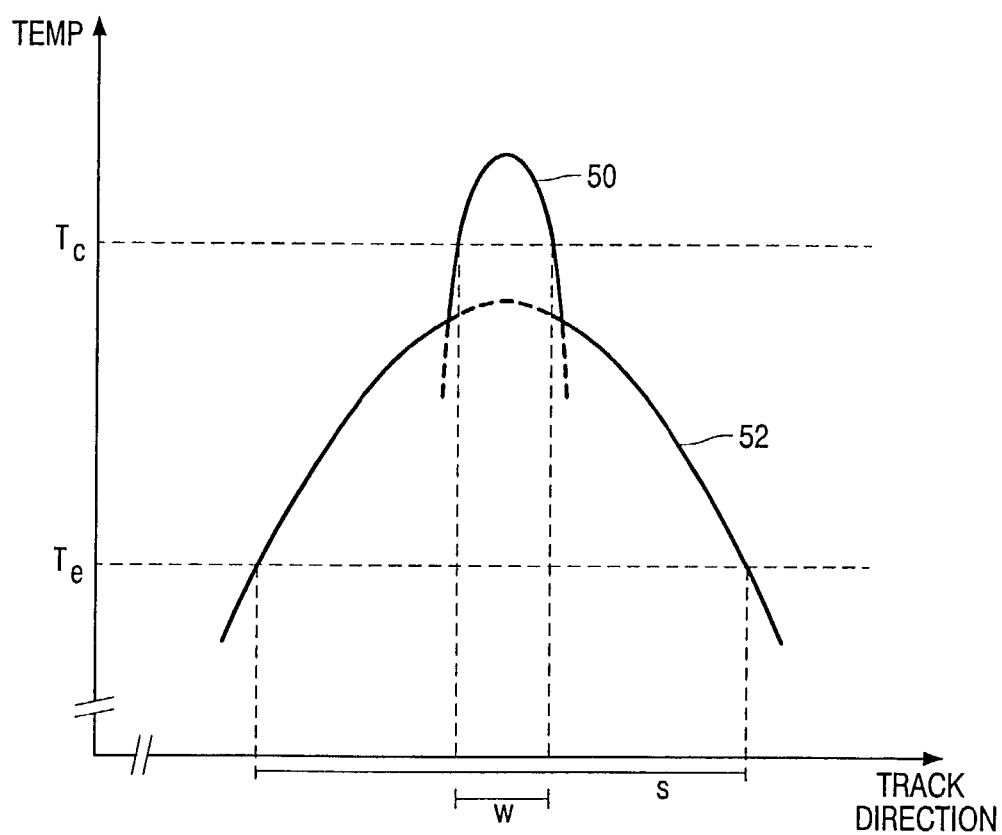
FIG. 5 illustrates characteristics of a temperature profile achieved in various embodiments of the invention.

FIG. 5 illustrates a temperature profile which may be achieved on the disk in the various embodiments of the invention described above. The temperature profile shown is axially symmetrical, however in practice due to the movement of the disk relative to the beams during scanning the profile will be somewhat asymmetrical, broadened towards the trailing edge of the beam. The temperature profile includes a first, relatively narrow, component 50 due to the heating effect of the first beam 7 in the first embodiment, or equivalents thereof in the second and other alternative embodiments described above. A second, relatively broad, component 52 is due to the heating effect of the second beam 9. The power levels of the first and second beams are controlled, within given power margins, such that the first component 50 includes a part having a temperature higher than the copy temperature $T_c$ of the MAMMOS disk, whilst the second component, taken as that produced by the second beam alone, does not reach the copy temperature $T_c$ of the MAMMOS disk but is above the expansion temperature $T_e$ of the disk. Thus, the first component 50 defines the width w of the copy window, and therefore the resolution of the readout process. The second component 52 defines the width s of the domain expansion area, which is larger than the copy window, from which the data readout signal of the system is derived. It should be noted that, since the two components are produced by the two beams additively, a relatively low power laser may be used to produce the first component 50 of the temperature profile, with a higher power laser being used to produce the second component 50.

Thus, it will be appreciated that magneto-optic scanning in accordance with the various embodiments of the invention described above provides a number of advantages. The data readout process can be carried out at a relatively high resolution, with relatively good power margins for each of the beams, whilst using a large signal beam spot for data readout, and a relatively high signal/noise ratio may be achieved.

The above embodiments are to be understood as illustrative examples of the invention. Further embodiments of the invention are envisaged. For example, other domain expansion techniques such as zero field MAMMOS and other magnetic domain expansion systems may be alternatively used. Furthermore, the two beams need not be of different wavelengths; the two beams may merely have a different NA whereby a temperature profile similar to that described in relation to FIG. 5 may be achieved. It is to be understood that any feature described in relation to one embodiment may also be used in other of the embodiments. Furthermore, equivalents and modifications not described above may also be employed without departing from the scope of the invention, which is defined in the accompanying claims.

The invention claimed is:

1. A method of reading out data from a domain expansion data storage medium, said medium comprising a data storage layer in which data is stored in the form of magnetic marks, and an expansion layer capable of copying and expanding domains from the storage layer, said method comprising:

applying a first radiation beam, having a first spot size focused on the expansion layer of the storage medium, in order to initiate copying of a domain from the storage layer to the expansion layer; and applying a second radiation beam, having a second spot size larger than said first spot size focused on the expansion layer of the storage medium, in order to read out data from the expansion layer.

2. A method according to claim 1, wherein said first beam comprises radiation of a shorter wavelength than radiation of said second beam.

3. A method according to claim 1, wherein said first beam has a first numeric aperture, and said second beam has a second numeric aperture, at the storage medium, and said first numeric aperture is greater than said second numeric aperture.

4. A method according to claim 1, wherein said first beam has a first numeric aperture $NA_1$, and said second beam has a second numeric aperture $NA_2$, at the storage medium, said first beam comprises a first wavelength $\lambda_1$ and said second beam comprises a second wavelength $\lambda_2$, wherein $\lambda_1/NA_1 < \lambda_2/NA_2$.

5. A method according to claim 1, wherein said first spot size is generated using a numeric aperture greater than 1.

6. A method according to claim 1, wherein said second spot size is generated using a numeric aperture less than 1.

7. A method according to claim 1, comprising providing an evanescent optical coupling between an optical component transmitting said first beam and said storage medium.

8. A method according to claim 1, wherein said first and second beams are applied on one side of the storage medium.

9. A method of reading out data from a domain expansion data storage medium, said medium comprising a data storage layer in which data is stored in the form of magnetic marks, and an expansion layer capable of copying and expanding domains from the storage layer, said method comprising:

applying a first radiation beam, having a first spot size on the storage medium, in order to initiate copying of a domain from the storage layer to the expansion layer, and applying a second radiation beam, having a second spot size larger than said first spot size on the storage medium, in order to read out data from the expansion layer;

wherein said first and second beams are applied on different sides of the storage medium.

10. A method according to claim 1, wherein said first beam is produced with a lower power than said second beam during readout.

11. A method according to claim 1, wherein said second beam is of an insufficient power alone in order to initiate copying of a domain from the storage layer to the expansion layer.

12. A method according to claim 1, wherein a copy window width is defined substantially entirely by a temperature profile component provided by said first beam.

13. A method according to claim 1, wherein a domain expansion area size is defined substantially entirely by a temperature profile component provided by said second beam.

14. A method according to claim 1, further comprising writing data to said storage medium using said first beam.

15. An optical scanning device that generates the first and second beams focused on the expansion layer, arranged to carry out the method of claim 1.

16. A method according to claim 1, further wherein the first spot size is less than a half of the second spot size.

17. A method according to claim 1, further wherein the first spot size is less than a third of the second spot size.

18. A method according to claim 9, further wherein the first radiation beam is applied from a first side of the medium, wherein the data storage layer being closer to the first side than the expansion layer, and wherein the second radiation beam is applied from a second side of the medium, wherein the expansion layer is closer the second side than the data storage layer.

19. A method according to claim 18, wherein applying the first radiation beam further comprises mounting a source of the first radiation beam on a slider.

20. A method according to claim 19, wherein applying the first radiation beam further comprises applying a very small aperture on the data storage layer.

* * * * *